United States Patent
Stelmar Netto et al.

(10) Patent No.: US 11,657,189 B2
(45) Date of Patent: May 23, 2023

(54) OBJECT LOSS PREVENTION USING COGNITIVE COMPUTING

(71) Applicant: KYNDRYL, INC., New York, NY (US)

(72) Inventors: Marco Aurelio Stelmar Netto, Sao Paulo (BR); Roberto Guarda, Americana (BR); Thamy Telles Do Nascimento, Campinas (BR); Marcio Rogerio Luccas, São Bernardo do Campo (BR); Christian Elias Tanajura Goulart, Sao Paulo (BR)

(73) Assignee: Kyndryl, Inc., New York, NY (US)

( * ) Notice: Subject to any disclaimer, the term of this patent is extended or adjusted under 35 U.S.C. 154(b) by 471 days.

(21) Appl. No.: 16/834,904

(22) Filed: Mar. 30, 2020

(65) Prior Publication Data
US 2021/0303740 A1  Sep. 30, 2021

(51) Int. Cl.
*G06F 21/88* (2013.01)
*G06N 3/08* (2023.01)
*G06N 3/04* (2023.01)

(52) U.S. Cl.
CPC .............. *G06F 21/88* (2013.01); *G06N 3/04* (2013.01); *G06N 3/08* (2013.01)

(58) Field of Classification Search
CPC ............. G06F 21/88; G06N 3/04; G06N 3/08
See application file for complete search history.

(56) References Cited

U.S. PATENT DOCUMENTS

| | | | |
|---|---|---|---|
| 7,825,794 B2 | 11/2010 | Janetis | |
| 8,218,735 B2 | 7/2012 | Brunson | |
| 8,810,392 B1 * | 8/2014 | Teller | G08B 21/24 340/572.1 |
| 8,823,527 B2 | 9/2014 | Husen | |
| 9,875,494 B2 | 1/2018 | Kalns | |
| 10,373,476 B2 * | 8/2019 | Buschmann | G08B 21/0277 |

(Continued)

FOREIGN PATENT DOCUMENTS

| | | |
|---|---|---|
| CN | 103793593 A | 5/2014 |
| CN | 105279557 A | 1/2016 |

(Continued)

OTHER PUBLICATIONS

"ClicknDig Item Finder", © 2020 ClicknDig, 2 pages, <https://clickndig.com/>.

(Continued)

*Primary Examiner* — Viral S Lakhia
(74) *Attorney, Agent, or Firm* — Erik Swanson; Matthew M. Hulihan; Heslin Rothenberg Farley & Mesiti PC

(57) ABSTRACT

Preventing the loss of physical objects using cognitive computing includes receiving, by a wearable device, information associated with a user of the wearable device. The information received includes one or more gestures to be used as a digital handshake and at least one physical object to be tracked. A set of models associated with the at least one physical object is downloaded to the wearable device. In response to an activation command, the wearable device performs the digital handshake with the at least one object to be tracked. The wearable device continuously monitors actions and movements performed by the user to determine whether the at least one physical object is in possession of the user.

20 Claims, 7 Drawing Sheets

(56) References Cited

U.S. PATENT DOCUMENTS

| | | |
|---|---|---|
| 10,417,554 B2 | 9/2019 | Scheffler |
| 10,548,805 B2* | 2/2020 | Geisinger ............. A61M 21/02 |
| 10,705,619 B2* | 7/2020 | Johri ..................... G06F 3/011 |
| 10,776,695 B1* | 9/2020 | Samples ................ G06F 18/24 |
| 11,385,611 B2* | 7/2022 | Burt ..................... G05B 19/042 |
| 2005/0221262 A1 | 10/2005 | Xiao |
| 2008/0256008 A1 | 10/2008 | Kwok |
| 2013/0289385 A1 | 10/2013 | Lozano |
| 2015/0140934 A1* | 5/2015 | Abdurrahman ....... H04W 8/005 |
| | | 455/41.2 |
| 2015/0286813 A1* | 10/2015 | Jakobsson ............ G06F 21/35 |
| | | 726/9 |
| 2016/0283197 A1 | 9/2016 | Wilber |
| 2017/0249434 A1* | 8/2017 | Brunner ............... G06F 16/258 |
| 2018/0350218 A1* | 12/2018 | Jeon ................. G06K 7/10475 |
| 2018/0365839 A1* | 12/2018 | Feng ...................... H04N 23/60 |
| 2019/0340348 A1* | 11/2019 | Yu ........................ G06F 1/1698 |
| 2019/0370507 A1* | 12/2019 | Byrd .................. H04W 68/005 |
| 2020/0126354 A1* | 4/2020 | Froy .................. G07F 17/3227 |

FOREIGN PATENT DOCUMENTS

| | | |
|---|---|---|
| CN | 107186722 A | 9/2017 |
| JP | 6353786 B2 | 7/2018 |
| KR | 20130000423 A | 1/2013 |
| KR | 101334271 B1 | 12/2013 |
| KR | 101800000 B1 | 12/2017 |
| KR | 1020156841 B1 | 8/2019 |
| WO | 2005047484 A2 | 5/2005 |

OTHER PUBLICATIONS

"Drive Smarter With Connected Car Technology", Hum by Verizon, © 2019 Verizon, 6 pages, <https://www.hum.com/>.

"Lapa Bluetooth Tracker | Find and protect anything that matters", Lapa, © 2020 Lapa, 14 pages, <https://findlapa.com/>.

"Locca GPS Tracker | your reliable GPS tracking device for animals, toddlers and objects", locca!, last printed Mar. 9, 2020, 11 pages, <https://locca.com/>.

Haider, Karrar, "8 Tracking Gadgets to Never Losing Your Belongings", Dec. 3, 2019, 8 pages, <https://www.hongkiat.com/blog/tracker-gadgets-never-lose-belongings/>.

Mell et al., "The NIST Definition of Cloud Computing", National Institute of Standards and Technology, Special Publication 800-145, Sep. 2011, 7 pages.

Roy, et al., "I am a Smartphone and I can Tell my User's Walking Direction", MobiSys'14, Jun. 16-19, 2014, 14 pages, <https://synrg.csl.illinois.edu/papers/walkcompass.pdf>.

Wang, et al,. "Deep learning for sensor-based activity recognition: A survey", Pattern Recognition Letters, vol. 119, Mar. 1, 2019, pp. 3-11, <https://www.sciencedirect.com/science/article/pii/S016786551830045X>.

Zhu, et al., "Feature extraction for robust physical activity recognition", Human-centric Computing and Information Sciences vol. 7, Article No. 16 (2017), <https://rd.springer.com/article/10.1186/s13673-017-0097-2>.

\* cited by examiner

OBJECT LOSS PREVENTION USING COGNITIVE COMPUTING

BACKGROUND

The present invention generally relates to the field of loss prevention systems, and more particularly to a cognitive method, system and computer program product for preventing the loss of physical objects.

The loss of personal belongings or physical objects can affect anyone at any time. Physical objects usually carried by user(s) can include keys, mobile devices, remote controller, bags, etc. Some of these objects (e.g., smartphones) may include tracking mechanisms, such as GPS or sensors, capable of providing a notification to the user when the object is lost. These tracking mechanisms, when available, may be advantageous to find the lost physical object. However, not all the physical objects carried by the user(s) include a tracking mechanism. Additionally, when tracking mechanisms are available, they are used in reaction to the loss of the physical object and not to prevent its loss. Therefore, improved techniques for preventing the loss of physical objects would be desirable.

SUMMARY

Shortcomings of the prior art are overcome and additional advantages are provided through the provision of a method for preventing the loss of physical objects. The method includes receiving, by a wearable device, information associated with a user of the wearable device. The information received includes one or more gestures to be used as a digital handshake and at least one physical object to be tracked. A set of models associated with the at least one physical object is downloaded to the wearable device. In response to an activation command, the wearable device performs the digital handshake with the at least one object to be tracked and continuously monitors actions and movements performed by the user to determine whether the at least one physical object is in possession of the user.

Another embodiment of the present disclosure provides a computer program product for preventing the loss of physical objects, based on the method described above.

Another embodiment of the present disclosure provides a computer system for preventing the loss of physical objects, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The loss of a personal possession or any physical object carried by a person is typically associated with higher levels of stress and frustration. This situation is particularly true when the lost physical object is not a trackable device. When available, tracking mechanisms are very helpful to locate the lost physical object. However, tracking mechanisms may not prevent the loss of the physical object or notify the person carrying the object of the possibility of losing the object.

Therefore, embodiments of the present invention provide a cognitive method, system, and computer program product for preventing the loss of physical objects carried by a user. The following described exemplary embodiments provide a system, method, and computer program product to, among other things, issuing a notification to a person carrying a physical object (i.e., user or owner of the physical object) to alert the person of the object being at a high risk of being lost or no longer being with the person. Specifically, the proposed embodiments take advantage of a plurality of sensors typically available in smart wearable devices, such as a smartwatch or smart ring, to initiate a digital handshake protocol by which any physical object carried by the user (e.g., keys, bag, bottle, etc.) can be tracked to prevent its loss. Therefore, the present embodiments have the capacity to improve the technical field of loss prevention systems by analyzing information regarding a user's context and his/hers interaction with one or more physical objects carried by the user in combination with a physical response of the user to determine when the one or more physical objects are at risk of being lost or have been misplaced by the user. The proposed embodiments use sensor technology readily available in current wearable smart devices to provide a tracking mechanism for items or physical objects that are not generally equipped with tracking capabilities such as backpacks, keys, wallets, bottles, etc.

Figure 1:
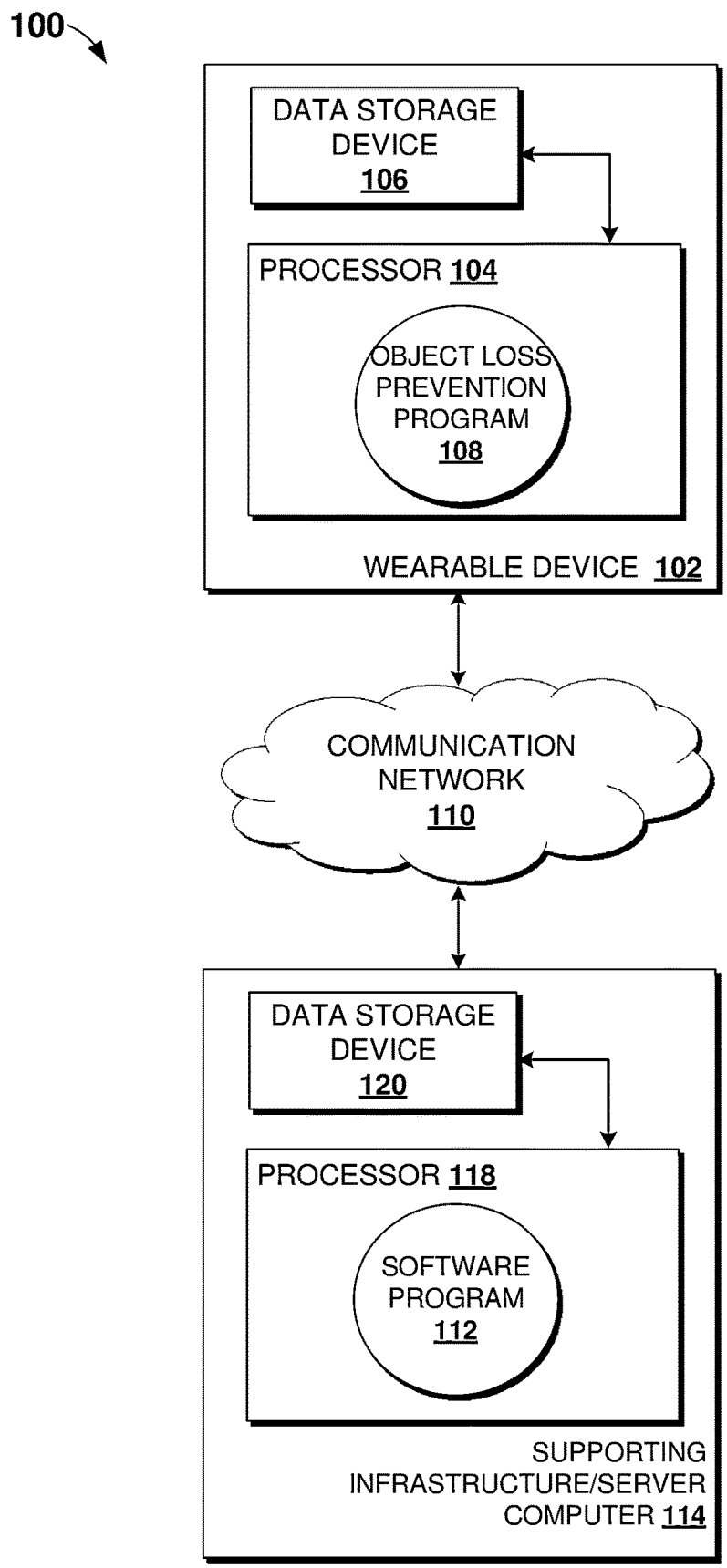
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a wearable device 102 and a communication network 110. The wearable device 102 may include a processor 104 and a data storage device 106 that is enabled to run an object loss prevention program 108.

According to an embodiment, the wearable device 102 is capable of detecting various inputs from a user and transmitting associated data to, for example, supporting infrastructure or server computer 114 via an opt-in and opt-out feature. Preferably, the wearable device 102 includes, for example, smart watches, smart rings, fitness trackers, smart glasses, smart headphones/earbuds, and the like.

The networked computer environment 100 may also include supporting infrastructure 114 with a processor 118 and a data storage device 120 that is enabled to run a software program 112. In some embodiments, supporting infrastructure 114 may be a resource management server, a web server or any other electronic device capable of receiving and sending data. In another embodiment, supporting infrastructure 114 may represent a server computing system utilizing multiple computers as a server system, such as in a cloud computing environment.

The object loss prevention program 108 running on wearable device 102 may communicate with the software program 112 running on supporting infrastructure 114 via the communication network 110. As will be discussed with reference to FIG. 4, wearable device 102 and supporting infrastructure 114 may include internal components and external components.

The networked computer environment 100 may include a plurality of wearable devices 102 and supporting infrastructures 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between wearable device 102 and supporting infrastructure 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
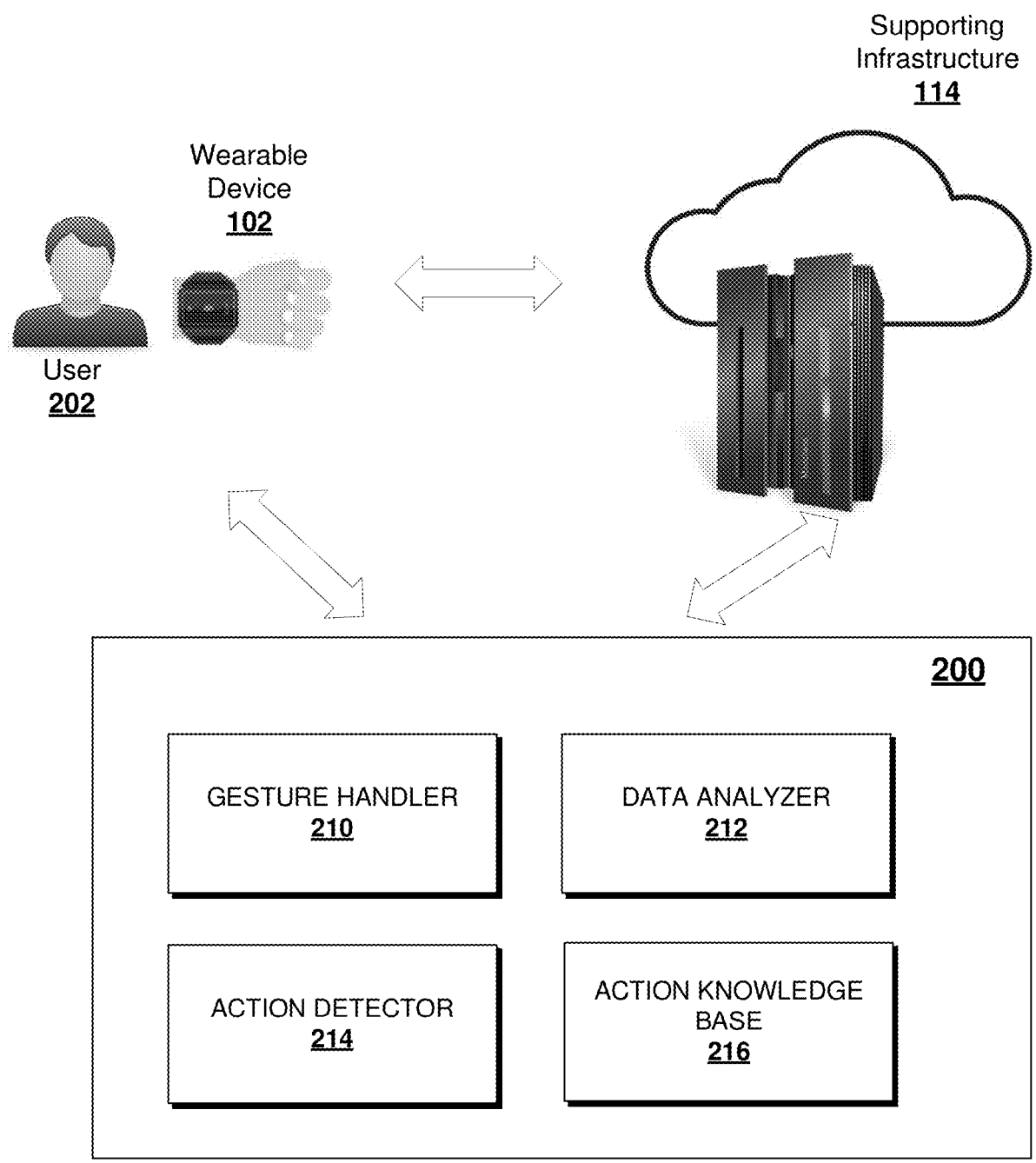
FIG. 2 is a block diagram depicting components of a system for cognitive object loss prevention, according to an embodiment of the present disclosure.

Referring now to FIG. 2, a block diagram depicting components of a system 200 for preventing the loss of physical objects is shown, according to an embodiment of the present disclosure. The system 200 may include a gesture handler 210, a data analyzer 212, an action detector 214, and an action knowledge base 216. As illustrated in the figure, the system 200 may be in communication with the wearable device 102 (worn by a user 202) and the supporting infrastructure 114.

According to an embodiment, the wearable device 102 may include any smart device equipped with a plurality of sensors (hereinafter "sensors") that can provide feedback data associated with the user 202. The wearable device 102 may be, for example, a smart watch or smart ring, although other wearable devices can also be considered. In a preferred embodiment, the wearable device 102 is equipped with an accelerometer, sound detection features, a microphone, a global positioning system (GPS), and the like. Particularly, the presence of an accelerometer may allow determining an orientation and a movement of the user's arm, and "see" objects, gestures, etc. In an embodiment, data generated by the device's accelerometer can be used to train machine learning or deep learning models that can detect important movements performed by a person when handling an object. For instance, the accelerometer can detect whether a person is grabbing an object, placing the object in a pocket, or using the object for daily activities (e.g., a person usually makes turn up and down movements when handling keys and tools). Further, the device's accelerometer can also be used to track a number of steps performed by the user 202 and the speed at which the user 202 walks once the object is in possession of the user 202.

It should be noted that any user data collection (e.g., biometric data) is done with user consent via an opt-in and opt-out feature. As known by those skilled in the art, an opt-in and opt-out feature generally relates to methods by which the user can modify a participating status (i.e., accept or reject the data collection). In some embodiments, the opt-in and opt-out feature can include a software application(s) available in the wearable device 204. Additionally, the user can choose to stop having his/her information being collected or used. In some embodiments, the user can be notified each time data is being collected. The collected data is envisioned to be secured and not shared with anyone without consent. The user can stop the data collection at any time.

The supporting infrastructure 114 may host one or more services containing movement and action related models, and a registration of user's objects to be tracked. The gesture handler 210 is responsible for executing a digital handshake based on user's gestures. Specifically, by conducting the digital handshake, the system 200 is capable of adding or removing a physical object from the list of physical objects that need to be monitored by the object prevention program 108 (FIG. 1). For instance, a parent may want to track a baby bottle he/she is holding to make sure it is not lost. The person grabs the bottle and performs a gesture that will be specific or unique for that object. Non-limiting examples of gestures that can be used as a digital handshake may include grab (the object) twice, grab and twist twice, or grab and shake. Once the digital handshake is executed, the bottle is incorporated into the list of physical objects the person is carrying. It should be noted that the digital signature of the movement of a particular digital handshake can be implemented via the use of analytics (machine learning or deep learning or statistics) on data generated by the accelerometer in the user's wearable device 102.

The data analyzer 212 is responsible for analyzing data captured by, for example, the accelerometer or sound detection features of the wearable device 102. Based on this data a context of the user and his/her interaction with usually carried physical objects can be determined and analyzed by the system 200.

The action detector 214 converts the data captured by the data analyzer 212 into action. For instance, based on the received data from the data analyzer 212, the system 200 may determine that an object being monitored has been dropped, grabbed by the user or someone else, transferred to another person or place, etc.

The action knowledge base 216 includes a set of models based on statistical analysis or machine learning to detect outliers of common places and movement for each physical object to be monitored by the system 200, as well as cognitive models to detect user's actions.

Figure 3A:
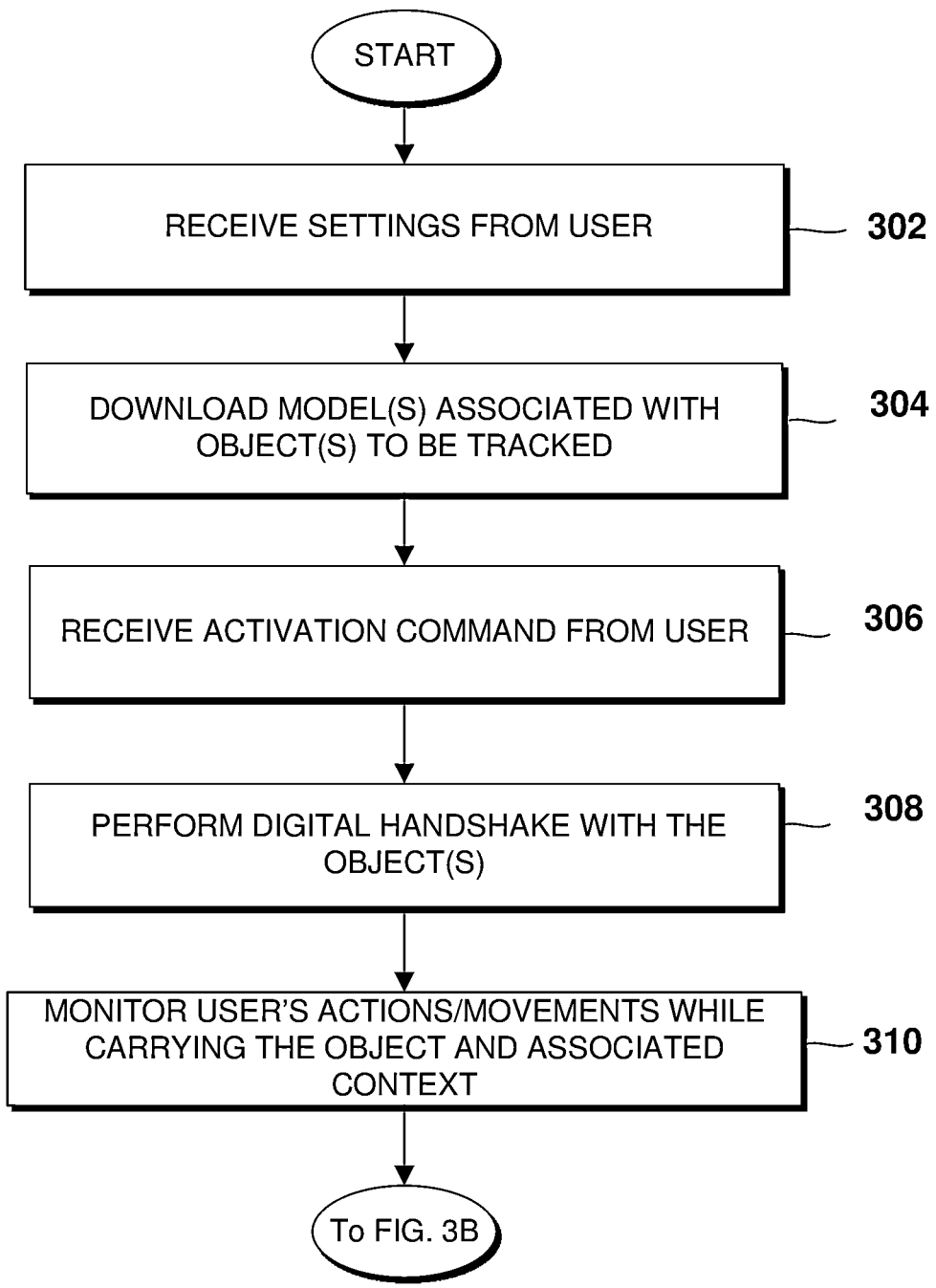
FIGS. 3A-3B depict a flowchart illustrating the steps of a method for cognitive object loss prevention, according to an embodiment of the present disclosure.
Figure 3B:
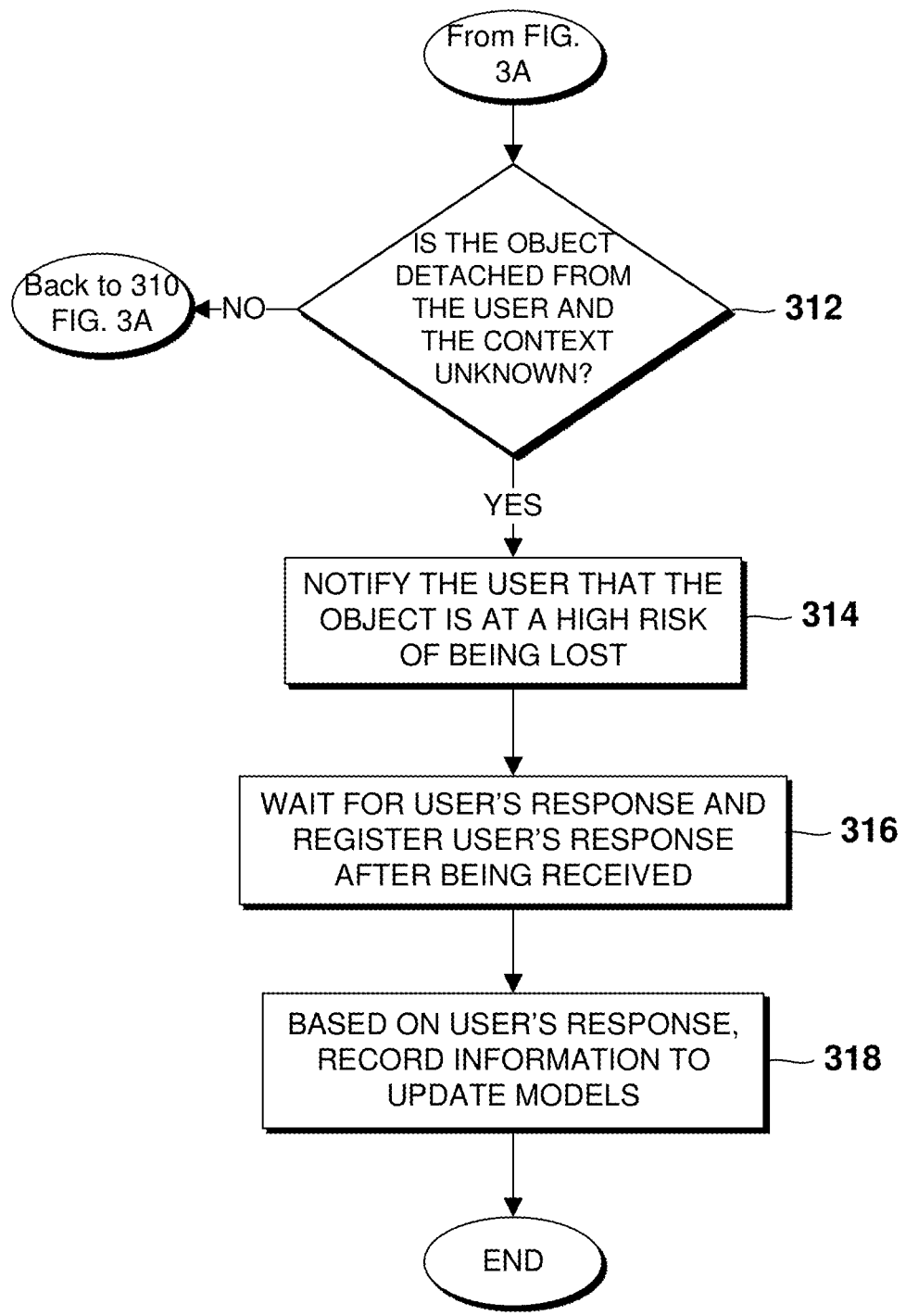

Referring now to FIG. 3, a flowchart illustrating the steps of a method for preventing losing a physical object, is shown, according to an embodiment of the present disclosure.

The method starts at step 302 in which a user (e.g., user 202 of FIG. 2) species settings for the system 200 (FIG. 2). For instance, in an embodiment, the user may specify gestures to be used as a digital handshake and the physical objects to be tracked (e.g., keys, bags, backpacks, bottles, etc.). During this step, a calibration mechanism can be implemented to refine common movements associated with a given set of actions performed by the user such as, for example grab, drop, give object to another person, and so on. In some embodiments, the user can configure a different handshake gesture for each object to be tracked.

At step 304, models for each physical object or type of objects to be tracked can be downloaded to the user's wearable device (e.g., wearable device 102 of FIG. 2). This may be necessary as the number of physical objects and associated context(s) can be large. The downloaded models include digital data representing how physical objects of different types are usually handled by different persons (e.g., keys, glasses, bottle, tools, etc.). For example, after grabbing a pair of sunglasses, a person may typically wear them, place them on his/her head, or place them on his/her shirt close to the neck. Such actions are relevant to detect a normal behavior of the user associated with a determined physical object.

Another example may include models for home keys. In this example, a person may grab his/her home key from a bag or pocket and then insert the key into a door, turn it, and, place the key in some place. The model may, as the person interacts with the key, learn that after opening the door, the user walks five to eight steps to place the key on a table. As can be understood, initial models can be customized to the user as the user interacts with different objects in different manners. Thus, any action different than those (common or daily actions) learned by the models may trigger an alarm that the user is about to lose an object (e.g., object was placed in a different or unusual location).

At step 306, an activation command is received from the user, and in response to the activation command, the user is instructed to perform a digital handshake with the physical object(s) to be tracked. According to an embodiment, the activation command may include a button in the wearable device 102 or a voice command from the user. After activation, the system 200 (FIG. 2) is capable of receiving data from a plurality of sensors in the wearable device 102 including, for example, data from accelerometer, sound detection features, microphone, gyroscopic features, GPS, etc. Specifically, according to an embodiment, data from the device's accelerometer can be received by the system 200 and used to track user's movements or actions as explained above with reference to FIG. 2. As mentioned above, the plurality of sensors in the wearable device 102 may allow tracking or determining activities typically performed by the user such as, for example, a direction in which the user walks.

At step 308, the user formalizes or specifies the physical objects to be tracked by performing a digital handshake with one or more physical objects. For instance, the user may grab a physical object twice, twist a wrist, or performed any other movement set by the user at step 302. The digital handshake performed with the physical object identifies it as the object to be tracked or monitored by the system 200 (FIG. 2). According to an embodiment, at step 310, while the user carries the physical object to be tracked, the system 200 (FIG. 2) continuously monitors user actions/movements by continuously analyzing data received from the plurality of sensors. By doing this, the system 200 (FIG. 2) is capable of determining whether the object is no longer with the user. In some embodiments, user's activity can be detected by using deep learning models. In other embodiments, additional models can also be used to determine user's activities including, for example, Hidden Markov Model, Naïve Bayes, Decision Trees and the like.

At step 312, the system 200 (FIG. 2) determines if the object is not with the user. Stated differently, the system 200 (FIG. 2) is capable of determining whether the object has been detached from the user. Further, if the system 200 (FIG. 2), at step 312, determines that the object is not with the user, a context associated with the object is determined by the system 200 (FIG. 2). For example, the system 200 (FIG. 2) may determine whether the object is placed on a spot known to the user under a certain context (place, time of the day, and/or day of the week). In this scenario no notification is sent to the user. According to an embodiment, an amount of time the object is not with the user can also be determined and associated with the context since, in some situations, the user may drop the object momentarily in a determined (known) place. For example, the user may place his/her backpack on a different area of the office for a short period of time.

In some embodiments, biometric sensors can be used to determine user's biometric indicators or markers typically associated with a stress response. The biometric indicators may include, for example, the user's heart rate. The biometric sensors may detect a change in the user's biometric indicators that suggest the user could be involved in a stressful situation (e.g., increased hear rate) which may increase the likelihood of losing the physical object(s) carried by the user. In such situations, the system 200 (FIG. 2) may, using the plurality of sensors in the user's wearable device, determine whether all the physical objects being tracked are still in possession of the user. In some embodiments, biometric data can be incorporated into the models in case there is a match between losing an object and altered biometric indicators. If there is a match between the user's biometric response and a given set of physical objects, the system 200 (FIG. 2) may trigger an alert for every physical object the user drops, places down, or give to another person, as way to prevent the loss of the physical object.

At step 314, once the system 200 (FIG. 2) determines that it is possible that the tracked object is lost or misplaced, a notification is sent to the user. The notification may be in the form of a vibration movement, a haptic feedback, a voice or text notification, etc.

At step 316, the system 200 (FIG. 2) waits for a response from the user and registers the user's response once it has been received. At step 318, in response to the user confirming that the prediction of system 200 (FIG. 2) was correct and the physical object was in fact at a high risk of being lost, the user's response is recorded and used to improve the set of models associated with the physical object. In an embodiment, this can be used as a data point to build a customized model associated only with the (current) user. However, in other embodiments, the user may opt to use the obtained data point(s) to update models that can be leveraged by other users.

Stated differently, in response to determining that the physical object is not in possession of the user, the system 200 (FIG. 2) may determine whether the context in which the physical object is placed satisfies a predetermined criteria. The predetermined criteria may be based on a history of user's activities including, for example, places in which the physical object is typically placed. In situations in which the context associated with the tracked physical object does not satisfy the predetermined criteria, a notification is sent to the user indicating a possible loss of the physical object. The user may confirm the system prediction by providing feedback to the system 200 (FIG. 2). In such situations, information associated with the context is used as a data point to update the set of models for the user.

In some situations, the user may leave the object in a different location intentionally. In such cases, the system 200 (FIG. 2) may generate a false positive result. In such situations, the user needs to register this information immediately to update the set of models and increase its accuracy. According to an embodiment, the user may perform a digital handshake movement with the object to indicate that the physical object will be left intentionally in a specific location. After performing this action, such physical object can be removed from the list of physical objects to be tracked by the system 200 (FIG. 2).

If, at step 318, the user confirms that the prediction is wrong, the user's response is recorded and used to train the set of models.

Therefore, the proposed embodiments provide a solution for preventing the loss of personal belongings (i.e., physical objects) carried by users of smart wearable devices based on a digital handshake instead of wireless or Bluetooth technologies. Thus, the proposed embodiments do not depend on network communication between the user and the items to be tracked.

Additionally, according to embodiments of the present disclosure, user's gestures are used as a digital handshake to start tracking an item or physical object, the use of training models allows for the continuous update of information associated with each tracked physical object. Moreover, the use of data captured by the device's sensors to determine whether the user is carrying the physical object and determining a user's context may facilitate recognizing situations in which the object might be at higher risk of being lost and taking appropriate actions by the user. The system 200 (FIG. 2) may also provide a mechanism to release the physical object from the list of objects to be tracked based on a digital handshake in situations where the physical object is planned to be left in a different location. By doing this training models can be updated accordingly improving the accuracy of the proposed system.

Finally, embodiments of the present disclosure include a mechanism for refining training models based on a user behavior and user's interaction with the physical objects being carried. Biometric indicators are also considered to detect stressful situations in which the possibility of losing personal belongings increase. These biometric indicators may also serve as a confirmation that a physical object is no longer with the user and the situation may have triggered a stress response in the user.

Figure 4:
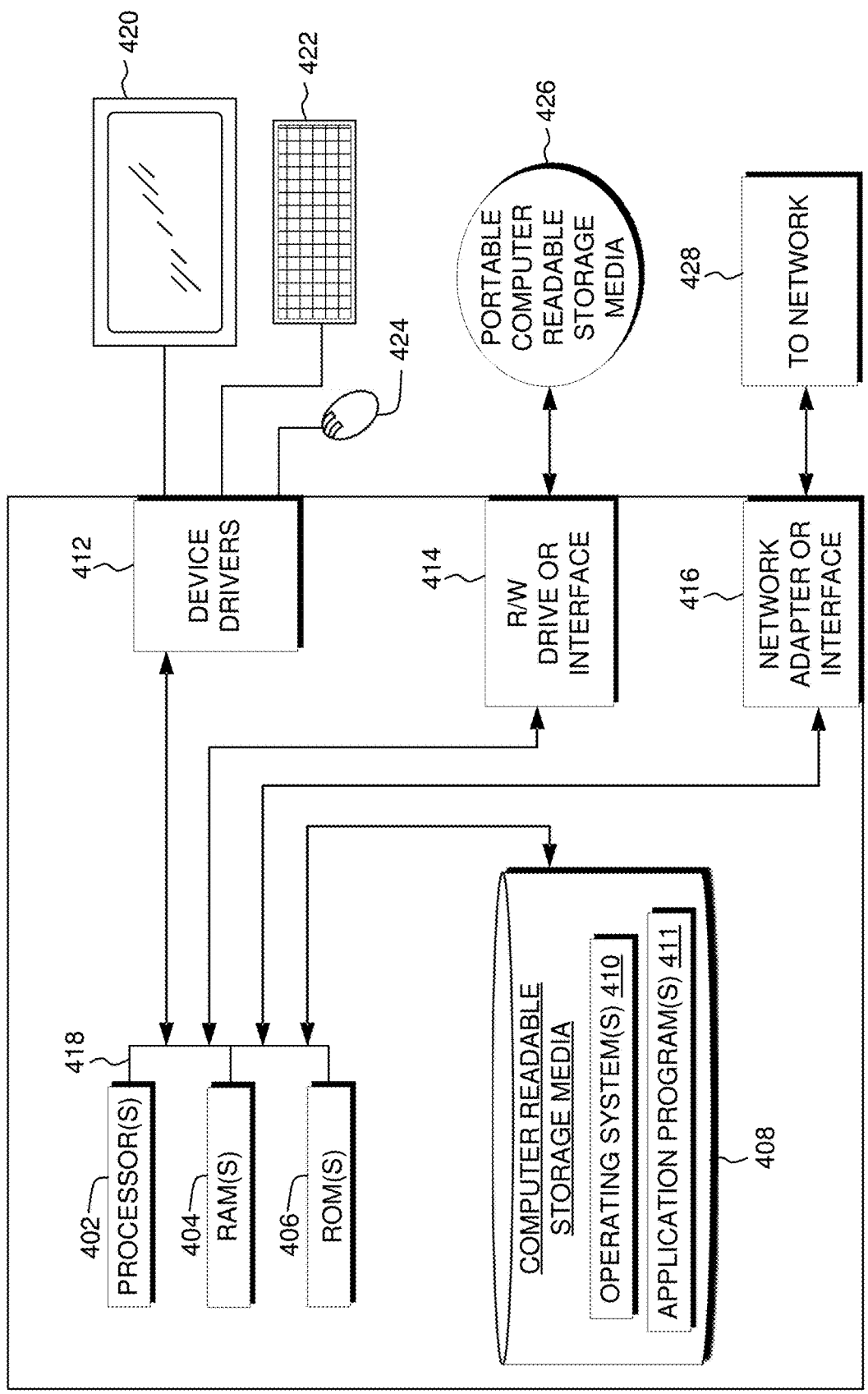
FIG. 4 is a block diagram of internal and external components of a computer system, according to an embodiment of the present disclosure.

Referring now to FIG. 4, a block diagram of components of wearable device 102 and supporting infrastructure 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Wearable device 102 and supporting infrastructure 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Wearable device 102 and supporting infrastructure 114 may also include a R/W drive or interface 414 to read from and write to one or more portable computer readable storage media 426. Application programs 411 on client wearable device 102 and supporting infrastructure 114 may be stored on one or more of the portable computer readable storage media 426, read via the respective R/W drive or interface 414 and loaded into the respective computer readable storage media 408.

Wearable device 102 and supporting infrastructure 114 may also include a network adapter or interface 416, such as a TCP/IP adapter card or wireless communication adapter (such as a 4G wireless communication adapter using OFDMA technology) for connection to a network 428. Application programs 411 on wearable device 102 and supporting infrastructure 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Wearable device 102 and supporting infrastructure 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
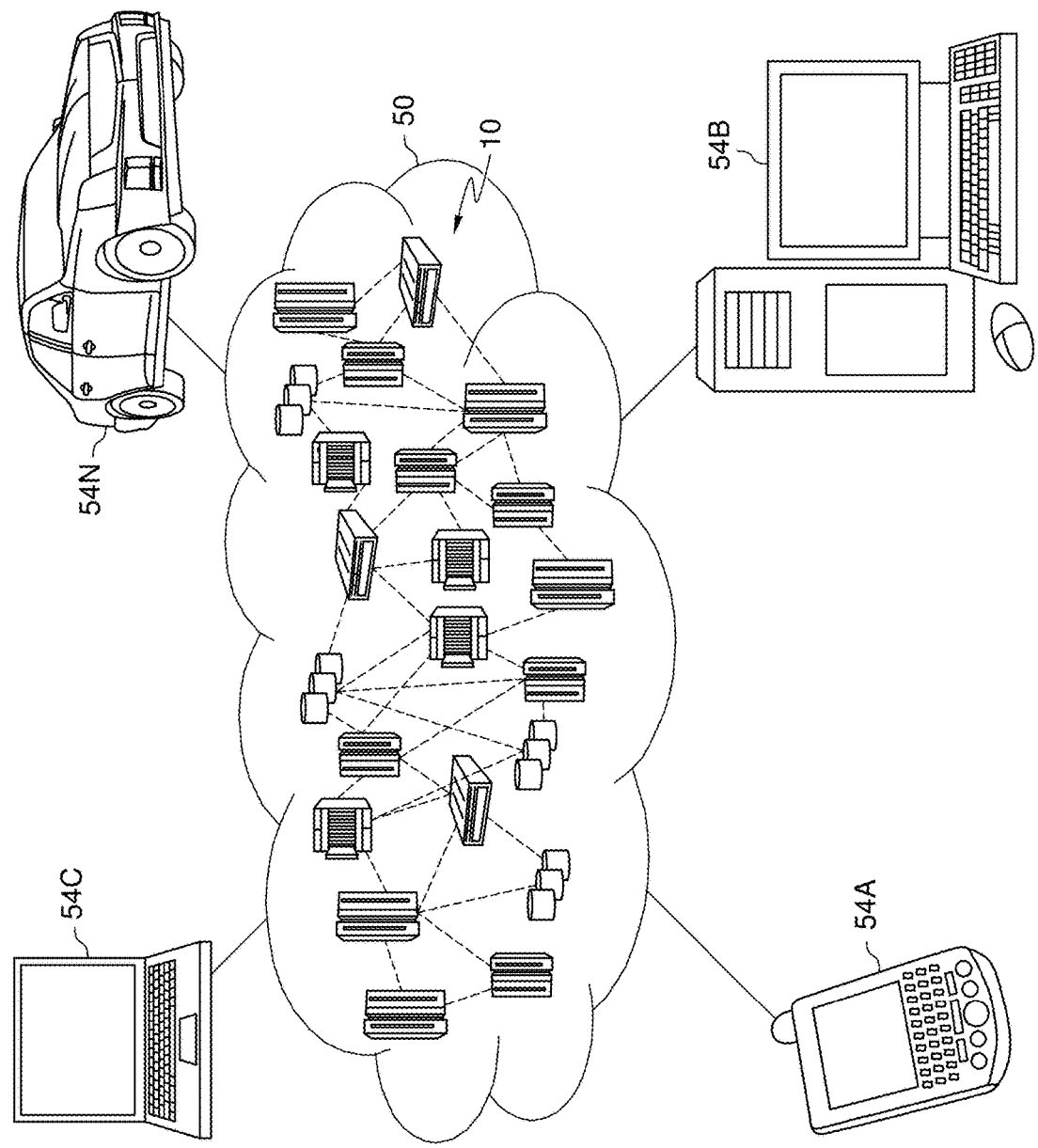
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
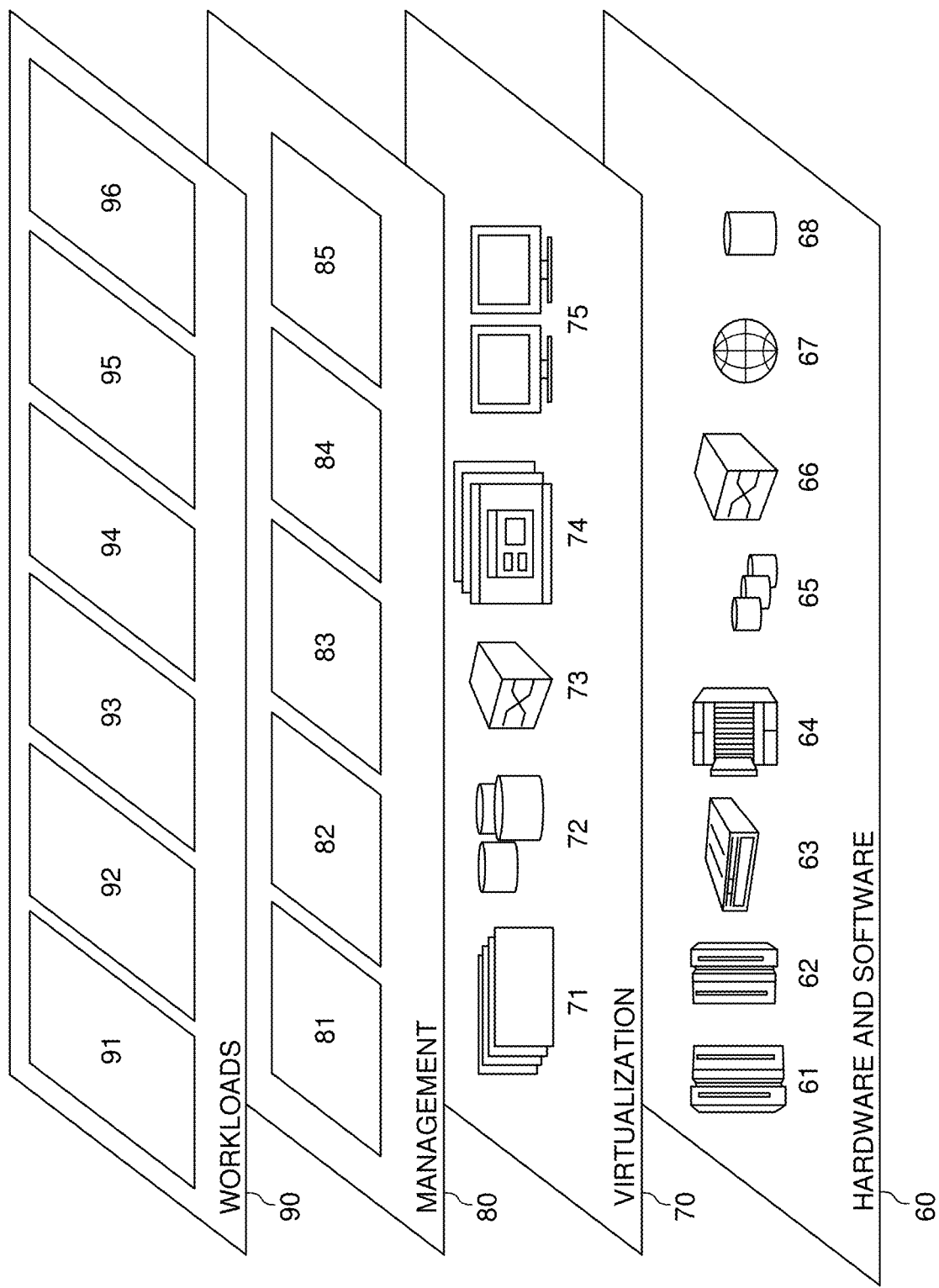
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automatic intent recognition using multiple languages 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for preventing loss of physical objects, comprising:
   receiving, by a wearable device, information associated with a user of the wearable device comprising one or more physical gestures to be used as a digital handshake and at least one physical object to be tracked, the one or more physical gestures corresponding to movements of the at least one physical object based on physical movements of the user handling the at least one physical object to be tracked;
   downloading, to the wearable device, a set of models associated with the at least one physical object to be tracked, the models comprising digital data representing how one or more physical objects of different types are physically handled by the user via physical movements of the user;
   in response to an activation command, performing, by the wearable device, the digital handshake with the at least one physical object to be tracked, wherein movement data from the wearable device is received based on the user handling the at least one physical object; and
   continuously monitoring, by the wearable device, actions and physical movements being performed by the user in physically handling the at least one physical object to determine whether the at least one physical object is in possession of the user.

2. The method of claim 1, further comprising:
   in response to determining that the at least one physical object is not in possession of the user, identifying, by the wearable device, whether a context in which the at least one physical object is placed satisfies a predetermined criteria.

3. The method of claim 2, further comprising:
   in response to determining that the context in which the object is placed satisfies the predetermined criteria, continuing, by the wearable device, monitoring actions and physical movements performed by the user.

4. The method of claim 2, further comprising:
   in response to determining that the context in which the at least one physical object is placed does not satisfy the predetermined criteria, sending, by the wearable device, a notification to the user indicating a possible loss of the physical object;
   in response to receiving a confirmation that the object was intentionally left by the user, identifying, by the wearable device, a false positive result;
   updating, by the wearable device, the set of models for the user with information associated with the false positive result; and
   in response to receiving a physical gesture from the user matching one of the one or more physical gestures to leave the object intentionally, removing, by the wearable device, the object from a list of objects to be tracked.

5. The method of claim 1, wherein the continuously monitoring the actions and physical movements performed by the user to determine whether the at least one physical object is in possession of the user further comprises:
receiving, by the wearable device, data from a plurality of sensors, the plurality of sensors comprising an accelerometer, sound detection features, gyroscopic features, a microphone, and global positioning system.

6. The method of claim 1, wherein the activation command includes at least one selected from the group consisting of: a button in the wearable device and a voice command from the user.

7. The method of claim 1, wherein actions and physical movements performed by the user are detected using deep learning models.

8. The method of claim 1, further comprising:
determining, using biometric sensors in the wearable device, a biometric indicator of the user;
in response to the biometric indicator indicating a stressful situation, determining whether the at least one physical object to be tracked is in possession of the user;
in response to the at least one physical object to be tracked not being in possession of the user, sending a notification to the user; and
incorporating biometric data associated with the determined biometric indicator into the set of models.

9. A computer system for preventing the loss of physical objects, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a wearable device, information associated with a user of the wearable device comprising one or more physical gestures to be used as a digital handshake and at least one physical object to be tracked, the one or more physical gestures corresponding to movements of the at least one physical object based on physical movements of the user handling the at least one physical object to be tracked;
downloading, to the wearable device, a set of models associated with the at least one physical object to be tracked, the models comprising digital data representing how one or more physical objects of different types are physically handled by the user via physical movements of the user;
in response to an activation command, performing, by the wearable device, the digital handshake with the at least one physical object to be tracked, wherein movement data from the wearable device is received based on the user handling the at least one physical object; and
continuously monitoring, by the wearable device, actions and physical movements being performed by the user in physically handling the at least one physical object to determine whether the at least one physical object is in possession of the user.

10. The computer system of claim 9, further comprising:
in response to determining that the at least one physical object is not in possession of the user, identifying, by the wearable device, whether a context in which the at least one physical object is placed satisfies a predetermined criteria.

11. The computer system of claim 10, further comprising:
in response to determining that the context in which the object is placed satisfies the predetermined criteria, continuing, by the wearable device, monitoring actions and physical movements performed by the user.

12. The computer system of claim 10, further comprising:
in response to determining that the context in which the at least one physical object is placed does not satisfy the predetermined criteria, sending, by the wearable device, a notification to the user indicating a possible loss of the physical object;
in response to receiving a confirmation that the object was intentionally left by the user, identifying, by the wearable device, a false positive result;
updating, by the wearable device, the set of models for the user with information associated with the false positive result; and
in response to receiving a physical gesture from the user matching one of the one or more physical gestures to leave the object intentionally, removing, by the wearable device, the object from a list of objects to be tracked.

13. The computer system of claim 9, wherein the continuously monitoring actions and physical movements performed by the user to determine whether the at least one physical object is in possession of the user further comprises:
receiving, by the wearable device, data from a plurality of sensors, the plurality of sensors comprising an accelerometer, sound detection features, gyroscopic features, a microphone, and global positioning system.

14. The computer system of claim 9, wherein the activation command includes at least one selected from the group consisting of: a button in the wearable device and a voice command from the user.

15. The computer system of claim 9, wherein actions and physical movements performed by the user are detected using deep learning models.

16. The computer system of claim 9, further comprising:
determining, using biometric sensors in the wearable device, a biometric indicator of the user;
in response to the biometric indicator indicating a stressful situation, verifying the at least one physical object to be tracked is in possession of the user;
in response to the at least one physical object to be tracked not being in possession of the user, sending a notification to the user; and
incorporating biometric data associated with the determined biometric indicator into the set of models.

17. A computer program product for preventing the loss of physical objects, comprising:
a computer readable storage medium having program instructions embodied therewith, wherein the computer readable storage medium is not a transitory signal per se, the program instructions executable by a device to cause the device to perform a method comprising:
receiving, by a wearable device, information associated with a user of the wearable device comprising one or more physical gestures to be used as a digital handshake and at least one physical object to be tracked, the one or more physical gestures corresponding to movements of the at least one physical object based on physical movements of the user handling the at least one physical object to be tracked;

downloading, to the wearable device, a set of models associated with the at least one physical object to be tracked, the models comprising digital data representing how one or more physical objects of different types are physically handled by the user via physical movements of the user;

in response to an activation command, performing, by the wearable device, the digital handshake with the at least one physical object to be tracked, wherein movement data from the wearable device is received based on the user handling the at least one physical object; and continuously monitoring, by the wearable device, actions and physical being movements performed by the user in physically handling the at least one physical object to determine whether the at least one physical object is in possession of the user.

18. The computer program product of claim 17, further comprising:
in response to determining that the at least one physical object is not in possession of the user, identifying, by the wearable device, whether a context in which the at least one physical object is placed satisfies a predetermined criteria.

19. The computer program product of claim 18, further comprising:
in response to determining that the context in which the object is placed satisfies the predetermined criteria, continuing, by the wearable device, monitoring actions and physical movements performed by the user.

20. The computer program product of claim 18, further comprising:
in response to determining that the context in which the at least one physical object is placed does not satisfy the predetermined criteria, sending, by the wearable device, a notification to the user indicating a possible loss of the physical object;

in response to receiving a confirmation that the object was intentionally left by the user, identifying, by the wearable device, a false positive result;

updating, by the wearable device, the set of models for the user with information associated with the false positive result; and in response to receiving a physical gesture from the user matching one of the one or more physical gestures to leave the object intentionally, removing, by the wearable device, the object from a list of objects to be tracked.

* * * * *